United States Patent
Lee et al.

(10) Patent No.: US 9,573,220 B2
(45) Date of Patent: Feb. 21, 2017

(54) SPOT WELDING APPARATUS

(71) Applicant: Hyundai Motor Company, Seoul (KR)

(72) Inventors: So Young Lee, Gyeonggi-do (KR); Sung Phil Ryu, Seoul (KR)

(73) Assignee: Hyundai Motor Company, Seoul (KR)

( * ) Notice: Subject to any disclaimer, the term of this patent is extended or adjusted under 35 U.S.C. 154(b) by 364 days.

(21) Appl. No.: 14/143,346

(22) Filed: Dec. 30, 2013

(65) Prior Publication Data

US 2015/0102018 A1    Apr. 16, 2015

(30) Foreign Application Priority Data

Oct. 14, 2013  (KR) ........................ 10-2013-0122245

(51) Int. Cl.
*B23K 11/31*     (2006.01)
*B23K 11/11*     (2006.01)

(52) U.S. Cl.
CPC .............. *B23K 11/314* (2013.01); *B23K 11/11* (2013.01); *B23K 11/115* (2013.01); *B23K 11/311* (2013.01); *B23K 11/312* (2013.01)

(58) Field of Classification Search
CPC ... B23K 11/314; B23K 11/312; B23K 11/115; B23K 11/11; B23K 11/311
See application file for complete search history.

(56) References Cited

U.S. PATENT DOCUMENTS

| 5,412,172 A * | 5/1995 | Ichikawa .............. B23K 11/115 219/86.41 |
| 5,628,923 A * | 5/1997 | Nishiwaki .......... B23K 11/3063 219/86.25 |
| 5,789,719 A * | 8/1998 | Pary ..................... B23K 11/317 219/86.25 |
| 5,818,007 A * | 10/1998 | Itatsu ................... B23K 11/314 219/86.25 |
| 6,313,427 B1 * | 11/2001 | Suita ..................... B23K 11/10 219/109 |
| 6,337,456 B1 * | 1/2002 | Taniguchi ............ B23K 11/315 219/86.25 |
| 8,312,611 B2 * | 11/2012 | Tobita ..................... B23K 11/11 29/281.5 |

FOREIGN PATENT DOCUMENTS

JP     2715577 B2    2/1998

* cited by examiner

*Primary Examiner* — David Angwin
*Assistant Examiner* — Biniam Asmelash
(74) *Attorney, Agent, or Firm* — Mintz Levin Cohn Ferris Glovsky and Popeo, P.C.; Peter F. Corless

(57) ABSTRACT

A spot welding apparatus according to is provided that includes an upper and lower moving unit, an upper welding gun, a left and right moving unit and a lower welding gun. In particular, the upper and lower moving unit includes a slide block that is provided at one side of an arm of a robot to move vertically by actuation of an actuator. The upper welding gun is mounted on the slide block and the left and right moving unit is installed at one side of the upper welding gun to horizontally move the upper welding gun by actuation of the actuator. Additionally, the lower welding gun is mounted to correspond to a lower side of the upper welding gun.

13 Claims, 8 Drawing Sheets

SPOT WELDING APPARATUS

CROSS-REFERENCE TO RELATED APPLICATION

This application claims priority to and the benefit of Korean Patent Application No. 10-2013-0122245 filed in the Korean Intellectual Property Office on Oct. 14, 2013, the entire contents of which are incorporated herein by reference.

BACKGROUND OF THE INVENTION (a) Field of the Invention

The present invention relates to a spot welding apparatus, and more particularly, to a spot welding apparatus that performs a welding operation by selecting an X-type or a C-type that matches a welding spot of a welding target to be universally applied to multiple vehicle models and enables a rapid welding operation in a limited amount of space within a minimum amount of time.

(b) Description of the Related Art

In general, during a manufacturing process of a vehicle, various structural parts such as a vehicle body panel molded by a press, and the like are bonded by a method such as welding to complete an integrated vehicle body. The completed vehicle body is painted and rust-prevention is applied throughout the surface of each part in a painting process. Thereafter, a design process is performed, such as assembling a part of a power train system and parts such as suspension, steering, and braking systems and subsequently, assembling a door and a trunk lid, a hood, and the like.

Further, in a vehicle body assembling process of the vehicle, spot resistance welding through a spot welding apparatus is frequently used as a method for bonding two vehicle body panels such as a roof, a pillar, a side panel, an opening unit flange of a vehicle body door, and the like.

The spot resistance welding is a process in which contacting metal surfaces are joined by the heat obtained from resistance to electric current. As such, the weld is typically made by holding work-pieces together under pressure exerted by electrodes. via a spot welding apparatus installed at an arm front end of a robot for spot welding.

A welding gun used in spot welding apparatus are divided into three types: an X-type welding gun, a C-type welding gun, and a special-type welding gun adopting a special lower arm according to the position of a welding portion and interference with to the vehicle body.

One spot welding apparatus selectively adopting the X-type welding gun, the C-type welding, and the special-type welding gun is installed through an arm of a robot. As a result, a first robot in which the spot welding apparatus adopting the X-type welding gun is installed, a second robot in which a spot welding apparatus adopting the C-type welding gun is installed, and a third robot in which a spot welding apparatus adopting the special-type welding gun is installed are installed in separately to achieve the appropriate spot welding operations.

However, in the conventional spot welding operation, since one spot welding apparatus is installed in the robot arm for each robot, only one spot is welded whenever the robot arm moves, and as a result, a lot of time is required to perform a predetermined number of welding spot operations, thereby degrading productivity and efficiency.

Further, lower welding guns having different shapes should be adopted according to the position and the shape of the welding spot, and as a result, facility investment costs increase, and in particular, when a plurality of robots mounted with a spot welding apparatus adopting a lower welding gun having a special shape is used, facility and maintenance costs increase and energy is excessively used. Additionally, a space occupancy rate of the robot in a mass production line also increases.

The above information disclosed in this Background section is only for enhancement of understanding of the background of the invention and therefore it may contain information that does not form the prior art that is already known in this country to a person of ordinary skill in the art.

SUMMARY

The present invention has been made in an effort to provide a spot welding apparatus that performs a welding operation while changing a type of a welding gun according to various welding spots of a welding target to be universally applied to multiple vehicle models, perform welding operations rapidly in a limited amount of space with a minimum amount of time to improve productivity, flexibility, and efficiency of a vehicle body process, and reduce the number of robots through application of one apparatus to save installation cost.

An exemplary embodiment of the present invention provides a spot welding apparatus, including: an upper and lower moving unit including a slide block that is provided at one side of an arm of a robot to move vertically by actuation of an actuator; an upper welding gun mounted on the slide block; a left and right moving unit installed at one side of the upper welding gun to horizontally move the upper welding gun by actuation of the actuator; and a lower welding gun mounted to correspond to a lower side of the upper welding gun. The upper and lower moving unit may be mounted through a separate bracket mounted on the arm of the robot.

Furthermore, in some exemplary embodiments of the present invention, the upper welding gun may include a first welding tip that protrudes in a longitudinal direction of a front end of the arm and a second welding tip that protrudes in a downward direction to the longitudinal direction.

The lower welding gun may include each of a third welding tip vertically provided at the front end of the arm and corresponding to the second welding tip and a fourth welding tip that protrudes horizontally to the third welding tip and in an opposite direction to the first welding tip.

The upper and lower moving unit may include a body vertically installed on the bracket, a driving motor installed at a lower end of the body, and a slider provided to move vertically on a screw shaft installed in the body and rotated by actuation of the driving motor, and mounted with the upper welding gun. Additionally in some embodiments, left and right moving unit may include a gear box provided at one side of the upper welding gun, an actuator installed at one side of the gear box in parallel to the upper welding gun, and a moving block provided to reciprocate on a screw shaft that is installed at another side of the gear box in parallel to the actuator and rotated by receiving the actuation of the actuator through the gear box, and connected with the upper welding gun.

The driving motor may be embodied as a step motor of which an RPM and a rotational direction are controllable.

A current conduction unit that conducts current may be installed at any one side of the upper welding gun and the lower welding gun. This current conduction unit may conduct current with the upper welding gun from a transformer installed at a lower side of the lower welding gun through a bus bar and a shunt.

More specifically, in some exemplary embodiments of the present invention, the first and second welding tips of the upper welding gun may be spaced apart from each other at about 90°. Likewise, the third and fourth welding tips of the lower welding gun may be spaced apart from each other at about 90°.

A rotating unit rotating the upper welding gun and the lower welding gun on the bracket may be further installed on one side of the bracket. Alternatively or additionally, the rotating unit may be formed by a rotary motor installed at one side of the bracket. This rotary motor may be embodied as a step motor of which an RPM and to a rotational direction are controllable.

Advantageously, according to exemplary embodiments of the present invention, a welding operation is performed while changing a type of an upper welding gun according to various welding spots of a welding target to perform a rapid welding operation in a limited amount of space during a minimum amount of time.

Further, the spot welding apparatus can be universally applied to multiple vehicle models regardless of a vehicle model, and the position and the shape of a welding spot and a rapid welding operation is provided by the exemplary embodiment of the present invention to improve productivity, flexibility, and efficiency of a vehicle body process. Additionally, the number of robots installed on a process line can be reduced through application of one apparatus to save facility investment cost.

DETAILED DESCRIPTION OF THE EMBODIMENTS

Figure 1:
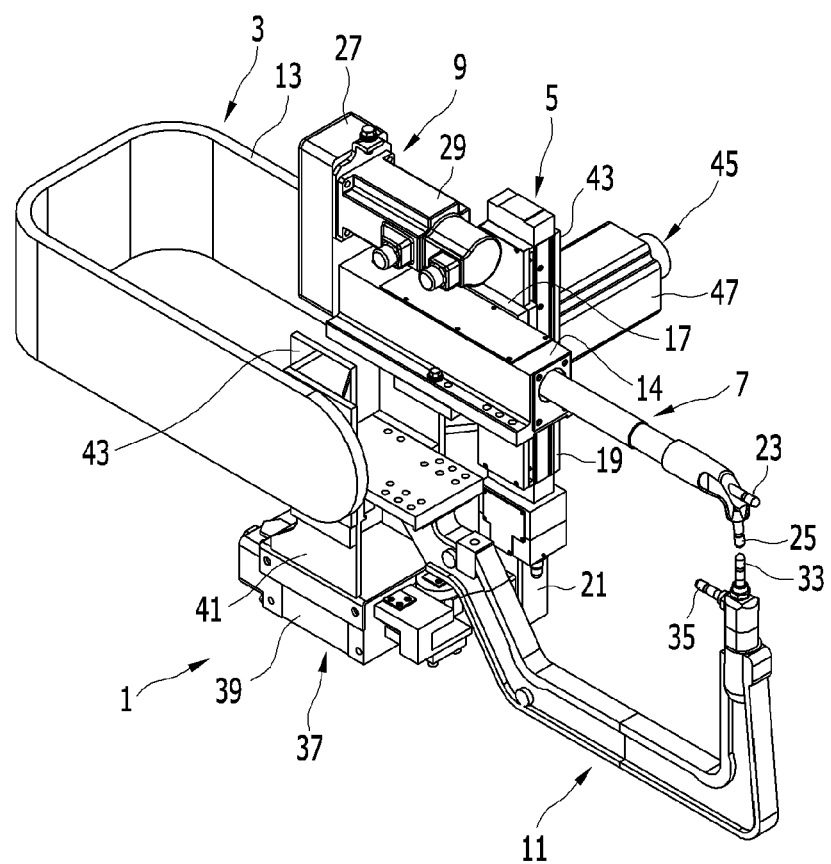
FIG. 1 is a perspective view of a spot welding apparatus according to an exemplary embodiment of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present invention will be described in detail with reference to the accompanying drawings. However, since the size and the thickness of each component illustrated in the drawings are arbitrarily expressed, the present invention is not particularly limited to the size and the thickness illustrated in the drawings and the thickness is enlarged in order to clearly express various parts and areas.

Parts which are not associated with a description are omitted in order to clearly to describe the exemplary embodiments of the present invention, and names of elements in the following description are distinguished into first, second, and the like in order to distinguish the elements because the names of the elements are the same and are not particularly limited to an order thereof.

However, in describing an exemplary embodiment of the present invention, a spot welding apparatus 1 according to an exemplary embodiment of the present invention performs a welding operation by changing a type of a welding gun between an X-type and a C-type to correspond to various welding spots of a welding target.

As a result, the spot welding apparatus 1 according to the exemplary embodiment of the present invention may be universally applied to multi vehicle models and perform a welding operation rapidly in a limited amount of space with a minimum amount of time to improve productivity, flexibility, and efficiency of a vehicle body process, and reduces the number of robots through application of one apparatus to save installation cost.

FIG. 1 is a perspective view of a spot welding apparatus according to an exemplary embodiment of the present invention. Referring to FIG. 1, a spot welding apparatus 1 according an exemplary embodiment of the present invention includes a bracket 3, an upper and lower moving unit 5, an upper welding gun 7, a left and right moving unit 9, and a lower welding gun 11. The bracket 3 may include a fork-shaped body 13 and have a mounting portion (not illustrated) mounted on an arm of a robot that is provided on one side thereof.

The upper and lower moving unit 5 may be mounted on one side of the body 13 of the bracket 3 to vertically move the upper welding gun 7 through a slider 17 that moves vertically.

Figure 2:
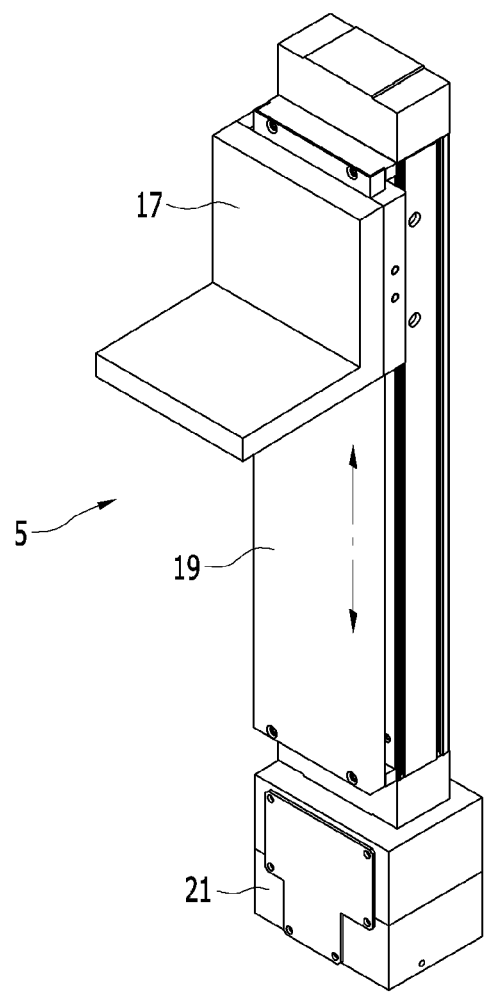
FIG. 2 is a perspective view of upper and lower moving units of the spot welding apparatus according to the exemplary embodiment of the present invention.

FIG. 2 is a perspective view of an upper and lower moving unit of the spot welding apparatus according to the exemplary embodiment of the present invention. Referring to FIG. 2, the upper and lower moving unit 5 includes a vertical frame 19, a driving motor 21, and the slider 17. The vertical frame 19 is vertically installed in the body 13 of the bracket 3 and has a screw shaft (not illustrated) installed therein. In addition, the driving motor 21 is installed at a lower end of the vertical frame 19 to rotate the screw shaft.

In this case, the driving motor 21 may be embodied as a step motor of which an RPM and a rotational direction are controllable.

The slider 17 may be installed on the screw shaft to be vertically movable, and as a result, the upper welding gun 7 is mounted thereon. Therefore, the upper welding gun 7 is vertically moved while the slider 17 is vertically moved according to an operation of the driving motor 21. The upper welding gun 7 is thus preferably mounted on the upper and lower moving unit 5 through the slider 17 as described above.

In addition, the upper welding gun 7 has a first welding tip 23 and a second welding tip 25 provided at a front end of the arm. The first welding tip 23 is provided to protrude in a longitudinal direction of the arm and the second welding tip 25 is provided to protrude downward toward the first welding tip 23. In this case, the first welding tip 23 and the second welding tip 25 may be spaced apart from each other at about 90°. The upper and lower moving unit 9 may be installed at one side of the upper welding gun 7 to horizontally move the upper welding gun 7.

Figure 3:
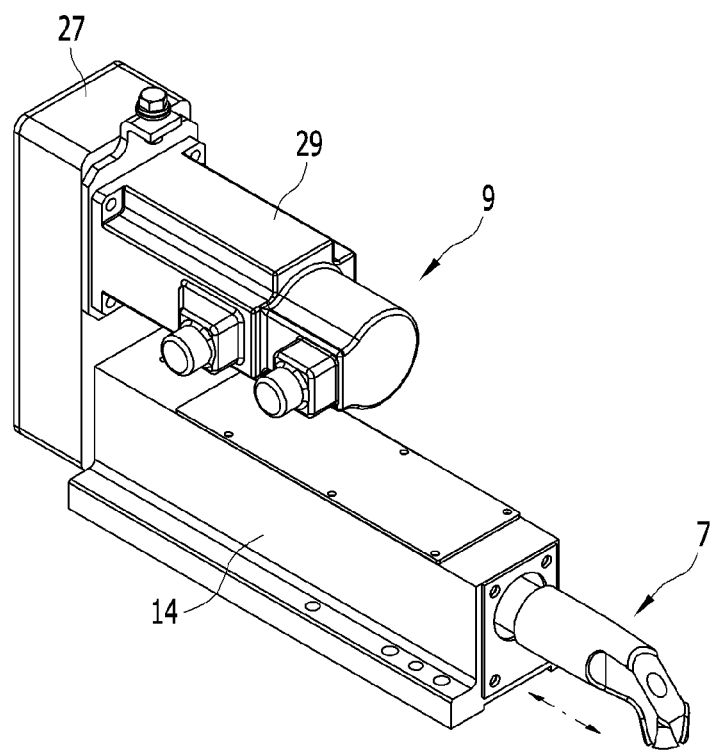
FIG. 3 is a perspective view of left and right moving units of the spot welding apparatus according to the exemplary embodiment of the present invention.

FIG. 3 is a perspective view of a left and right moving unit of the spot welding apparatus according to the exemplary embodiment of the present invention. Referring to FIG. 3, the left and right moving unit 9 includes a gear box 27, an actuator 29, and a moving block (not illustrated).

The gear box 27 may be provided perpendicular to the upper welding gun 7 at an opposite side where the first and second welding tips 23 and 25 of the upper welding gun 7 are provided. The actuator 29 is installed in parallel to the upper welding gun 7 at one side of the gear box 27.

The moving block may be installed at another side of the gear box 27 through a case 14 and configured to receive an operation of the actuator 29 through the gear box 27 to horizontally reciprocate on a screw shaft (not illustrated) that is rotated in the case 14.

Herein, the upper welding gun 7 is mounted on the moving block and the upper welding gun 7 is vertically moved by the operation of the actuator 29 during the welding operation. More specifically, the actuator 29 may be embodied as a roller screw actuator that converts rotational torque of an electric motor into a linear motion.

The actuator rotates the screw shaft (not illustrated) positioned in parallel to the actuator 29 through the gear box 27, and as a result, the motion of the moving block 31 is converted into the linear motion on the screw shaft to horizontally reciprocate the upper welding gun 7.

The roller screw actuator has a basic configuration in which a nut-type moving block that engages in a thread of a screw shaft moves forward/backward while a screw shaft connected to a driving shaft of the electric motor is rotated by motor driving force. Therefore, since a configuration of the roller screw actuator which may be adopted as an actuator is a known configuration which is used widely across industries, a detailed description thereof will be omitted.

Meanwhile, the lower welding gun 11 is mounted at a lower side of the upper welding gun 7 to correspond to each other. In addition, the lower welding gun 11 includes a third welding tip 33 and a fourth welding tip 35 that correspond to the first and second welding tips 23 and 25 of the upper welding gun 7, which are provided at the front end of the arm.

The third welding tip 33 is provided vertically to the front end of the arm to correspond to the second welding tip 25 of the upper welding gun 7. The fourth welding tip 35 is provided to protrude in parallel to the third welding tip 33 and in an opposite direction to the first welding tip 23 of the upper welding gun 7. In this case, the third welding tip 33 and the fourth welding tip 35 may be provided to be spaced apart from each other at 90°.

Meanwhile, a current conduction unit 37 may be installed at any one side of the upper welding gun 7 and the lower welding gun 11. This current conduction unit 37 may include a transformer 39, a bus bar, and a shunt. The transformer 39 may be installed at a lower side of the lower welding gun 11, and the bus bar and the shunt are in this case installed at one side of the transformer 39 to allow current to be conducted to the upper welding gun 7 and the lower welding gun 11. Herein, the shunt may be connected with the body 13 of the bracket 3, the transformer 39, and the upper and lower moving unit 5 to allow current to be conducted therethrough.

It should be noted, however, that the current conduction unit 37 installed in the spot welding apparatus 1 has a known function which is widely used in the art and a more detailed description will be omitted.

Furthermore, for reference numerals 41 and 43 on the figure represent a frame that fixes the transformer 39 to the bracket 3. A rotating unit 45 that rotates the upper welding gun 7 and the lower welding gun 11 to the bracket 3 may be installed at one side of the body 13 of the bracket 3.

Figure 4:
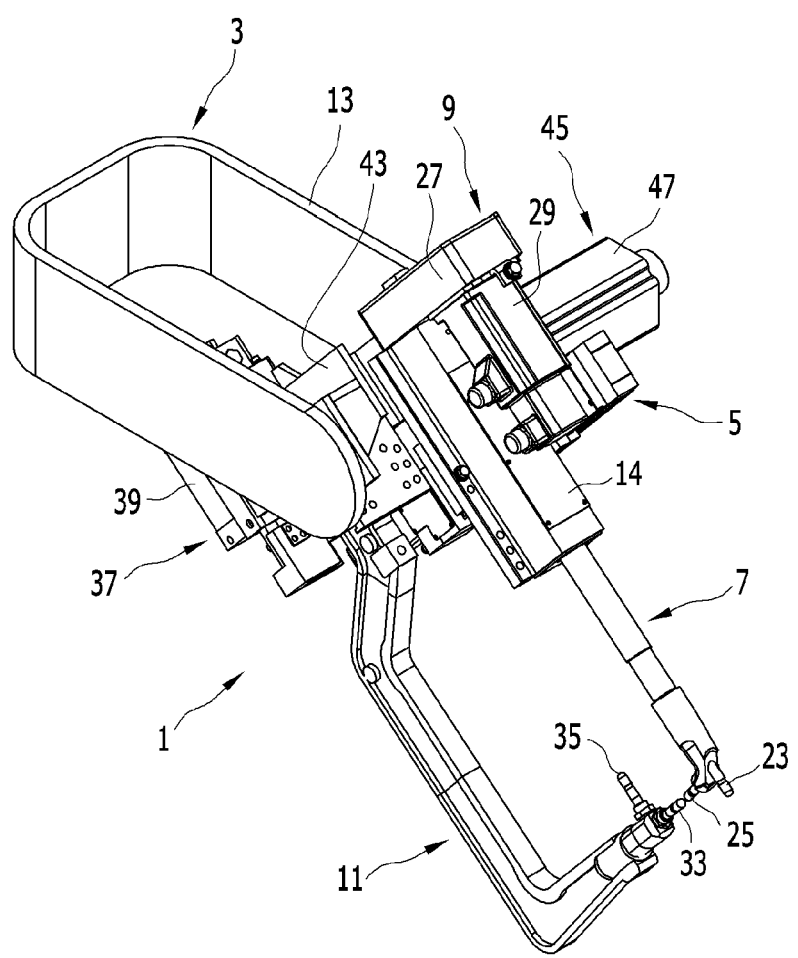
FIG. 4 is a perspective view by an operation of a rotating unit of the spot welding apparatus according to the exemplary embodiment of the present invention.

FIG. 4 is a perspective view by an operation of a rotating unit of the spot welding apparatus according to the exemplary embodiment of the present invention. Referring to FIG. 4, the rotating unit 45 may be embodied as a rotary motor 47, and as the rotary motor 47 may be installed through the body 13 of the bracket 3 to be actuated, all components other than the bracket 3 may be rotated accordingly.

In this case, in the rotary motor 47, a driving shaft may be installed on the bracket 3 through the body 13 of the bracket 3 and directly connected with components that are connected to each other to rotate the components to the bracket 3. The components may be hinged to the bracket 3 at an opposite side to which the driving shaft of the rotary motor 47 is joined in order to rotate the components.

Hereinafter, an operation of the spot welding apparatus 1 having such a configuration will be described with reference to FIGS. 5 to 8. FIGS. 5 to 8 are operating state diagrams of the spot welding apparatus according to the exemplary embodiment of the present invention.

Figure 5:
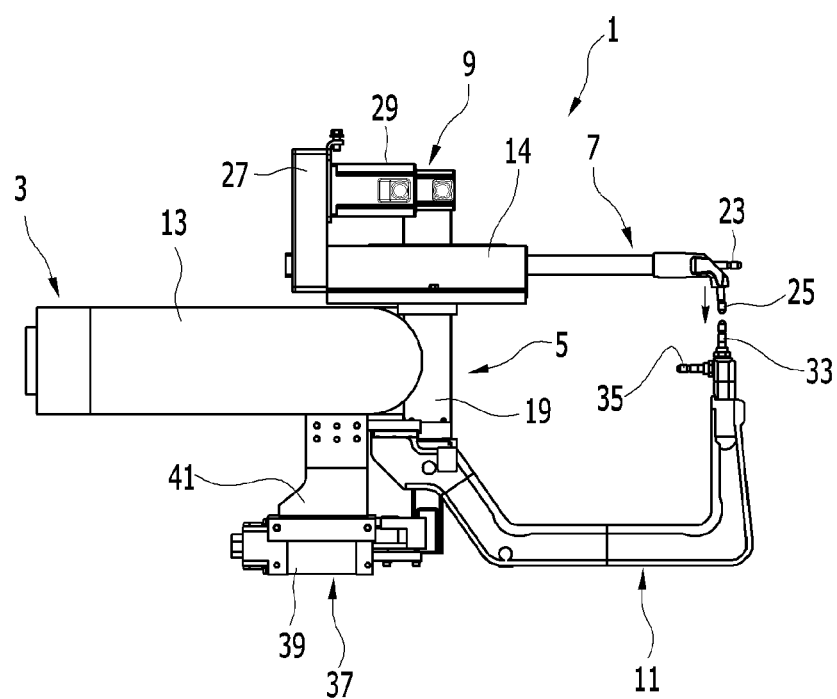
FIGS. 5 to 8 are operating state diagrams of the spot welding apparatus according to the exemplary embodiment of the present invention.
Figure 6:
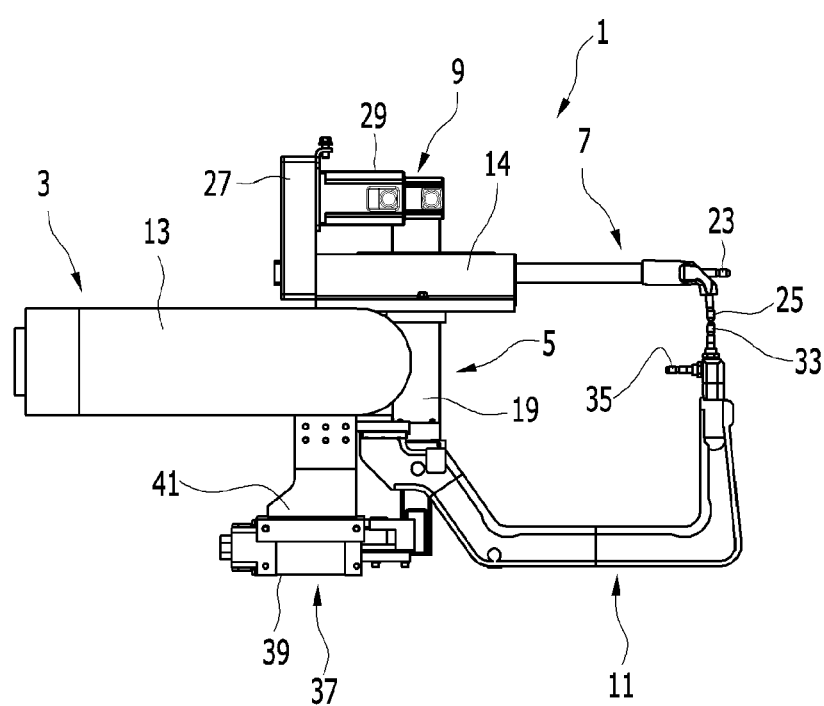

First, when a welding is performed, the third welding tip 33 of the lower welding gun 11 supports a lower portion of a welding spot (not illustrated) of a welding target in a state of FIG. 5. Thereafter, while the upper welding gun 7 moves downward by actuation of the upper and lower moving unit 5 as illustrated in FIG. 6, the second welding tip 25 presses the top of the welding spot to perform the welding operation (e.g., a X-type welding gun is applied).

Figure 7:
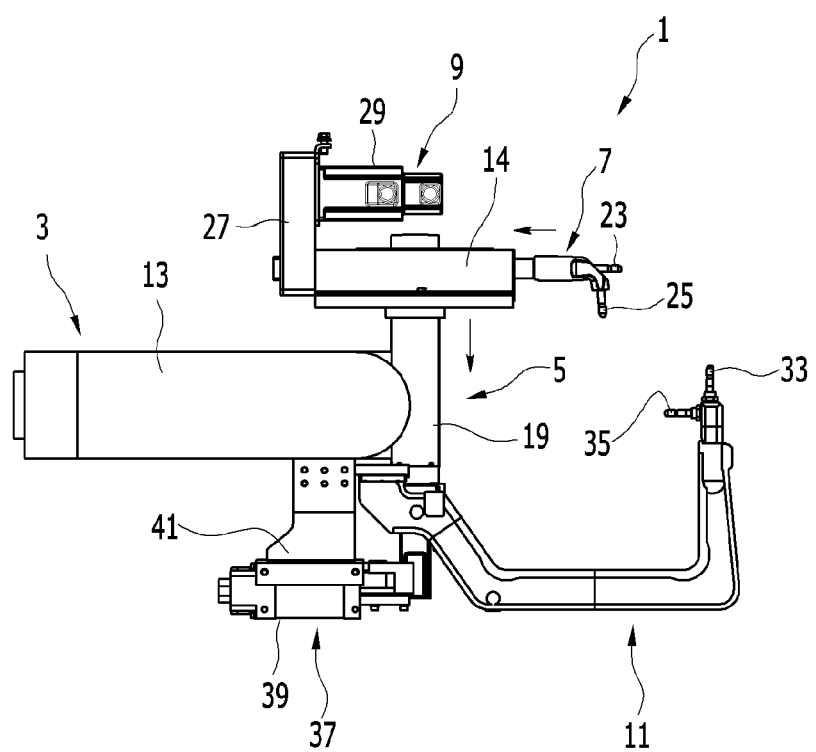
Figure 8:
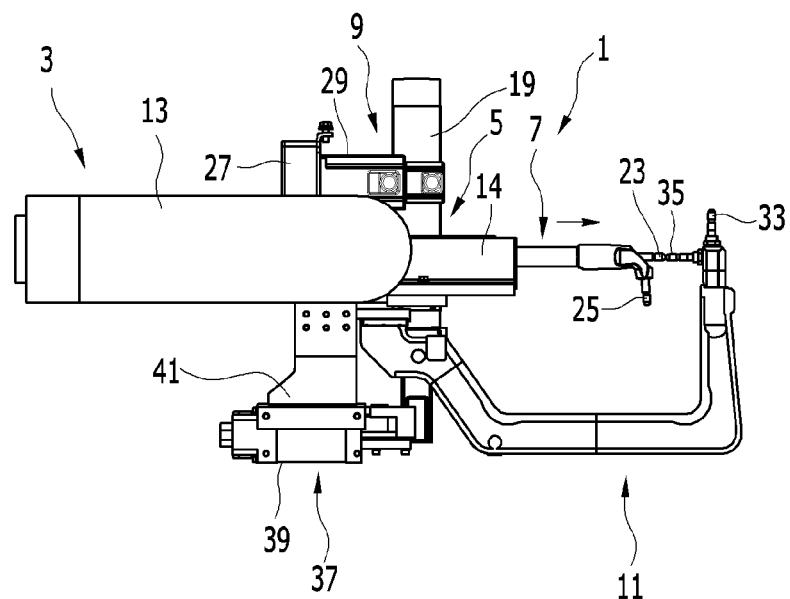

In addition, when the first welding tip 23 of the upper welding gun 7 is required due to a change in shape and position of the welding spot of the welding target, the upper welding gun 7 retreats in an arrow direction by actuation of the left and right moving unit 9 as illustrated in FIG. 7. Thereafter, the upper welding gun 7 is moved downward so that the first welding tip 23 of the upper welding gun 7 corresponds to the fourth welding tip 35 of the lower welding gun 11 as illustrated in FIG. 8 by actuation of the upper and lower moving unit 5.

In addition, again, the fourth welding tip 35 of the lower welding gun 11 supports the bottom of the welding spot of the welding target, and the upper welding gun 7 advances in an arrow direction, and as a result, the first welding tip 23 presses against the top of the welding spot, thereby performing the welding operation (e.g., a C-type welding gun).

Meanwhile, when the shape and the position of the welding spot of the welding target are changed, the rotary motor 39 of the rotating unit 37 is actuated to rotate components other than the bracket 3 as illustrated in FIG. 4. As a result, the welding operation is performed while easily coping with the change in shape and position of the welding spot of the welding target through a series of actuation states described above.

Advantageously, according to the spot welding apparatus 1 according to the exemplary embodiment of the present invention configured as above, the welding operation is performed by automatically selecting the corresponding welding tips 23, 25, 33, and 35 to correspond to various welding spots of the welding target by the first and second welding tips 23 and 25 provided in the upper welding gun 7 and the third and fourth welding tips 33 and 35 provided in the lower welding gun 11, and the rotating unit 45 to perform a welding operation rapidly in a limited amount of space with a minimum amount of time.

Further, the spot welding apparatus can be universally applied to multiple to vehicle models regardless of a vehicle model, and the position and the shape of a welding spot and a rapid welding operation is provided to improve productivity, flexibility, and efficiency of a vehicle body process. Additionally, the number of robots installed on a process line can be reduced through application of one apparatus to save facility investment cost.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

| | |
|---|---|
| 1: Spot welding 장치 | 3: Bracket |
| 5: Upper and lower moving unit | 7: Upper welding gun |
| 9: Left and right moving unit | 11: Lower welding gun |
| 13: Body | 14: Case |
| 17: Slider | 19: Vertical frame |
| 21: Driving motor | 23: First welding tip |
| 25: Second welding tip | 27: Gear box |
| 29: Actuator | 33: Third welding tip |
| 35: Fourth welding tip | 37: Current conduction unit |
| 39: Transformer | 41, 43: Frame |
| 45: Rotating unit | 47: Rotary motor |

What is claimed is:

1. A spot welding apparatus, comprising:
   a bracket configured to be mounted on an arm of a robot;
   an upper and lower moving unit including a slider that is provided at one side of the bracket, the slider configured to move vertically by actuation of an actuator;
   an upper welding gun mounted on the slider, wherein the upper welding gun includes a first welding tip that protrudes in a longitudinal direction of a front end of the arm and a second welding tip that protrudes in a downward direction;
   a left and right moving unit installed at one side of the upper welding gun to horizontally move the upper welding gun by actuation of the actuator; and
   a lower welding gun mounted to correspond to a lower side of the upper welding gun, wherein the first and second welding tips of the upper welding gun are spaced apart from each other at about 90°.

2. The spot welding apparatus of claim 1, wherein:
   the upper and lower moving unit is mounted via a separate bracket on the arm of the robot.

3. The spot welding apparatus of claim 1, wherein:
   the lower welding gun includes each of a third welding tip vertically provided at the front end of the arm and corresponding to the second welding tip, and a fourth welding tip that protrudes horizontally to the third welding tip and in an opposite direction to the first welding tip.

4. The spot welding apparatus of claim 2, wherein:
   the upper and lower moving unit includes:
   a body vertically installed on the bracket;
   a driving motor installed at a lower end of the body; and
   the slider provided to move vertically on a screw shaft installed in the body and rotated by actuation of the driving motor, and mounted with the upper welding gun.

5. The spot welding apparatus of claim 1, wherein:
   the left and right moving unit includes:
   a gear box provided at one side of the upper welding gun;
   an actuator installed at one side of the gear box in parallel to the upper welding gun; and
   a moving block provided to reciprocate on a screw shaft that is installed at another side of the gear box in parallel to the actuator and rotated by receiving the actuation of the actuator through the gear box, and connected with the upper welding gun.

6. The spot welding apparatus of claim 4, wherein:
   the driving motor is a step motor of which RPM and a rotational direction are controllable.

7. The spot welding apparatus of claim 1, wherein:
   a current conduction unit that conducts current is installed at any one side of the upper welding gun or the lower welding gun.

8. The spot welding apparatus of claim 7, wherein:
   the current conduction unit conducts current with the upper welding gun from a transformer installed at a lower side of the lower welding gun through a bus bar and a shunt.

9. The spot welding apparatus of claim 3, wherein:
   the third and fourth welding tips of the lower welding gun are spaced apart from each other at about 90°.

10. The spot welding apparatus of claim 1, further comprising:
    a rotating unit configured to rotate the upper welding gun and the lower welding gun relative to the bracket, the rotating unit being installed on one side of the bracket.

11. The spot welding apparatus of claim 10, wherein:
    the rotating unit is a rotary motor installed at one side of the bracket.

12. The spot welding apparatus of claim 11, wherein:
    the rotary motor is a step motor of which RPM and a rotational direction are controllable.

13. A spot welding apparatus, comprising:
    a bracket configured to be mounted on an arm of a robot;
    an upper and lower moving unit including a slider that is provided at one side of the bracket, the slider configured to move vertically by actuation of an actuator;
    an upper welding gun mounted on the slider, wherein the upper welding gun includes a first welding tip that protrudes in a longitudinal direction of a front end of the arm and a second welding tip that protrudes in a downward direction;
    a left and right moving unit installed at one side of the upper welding gun to horizontally move the upper welding gun by actuation of the actuator; and
    a lower welding gun mounted to correspond to a lower side of the upper welding gun,
    wherein the lower welding gun includes each of a third welding tip vertically provided at the front end of the arm and corresponding to the second welding tip, and a fourth welding tip that protrudes horizontally to the third welding tip and in an opposite direction to the first welding tip, and the third and fourth welding tips of the lower welding gun are spaced apart from each other at about 90°.

* * * * *